(12) United States Patent
Wu

(10) Patent No.: US 8,072,465 B2
(45) Date of Patent: Dec. 6, 2011

(54) IMAGE PROCESSING METHOD AND SYSTEM

(75) Inventor: Jiun-Yuan Wu, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 831 days.

(21) Appl. No.: 12/124,227

(22) Filed: May 21, 2008

(65) Prior Publication Data
US 2009/0289969 A1   Nov. 26, 2009

(51) Int. Cl.
  G09G 5/02 (2006.01)
  G06T 5/00 (2006.01)
  G06T 3/40 (2006.01)
  H04N 5/445 (2006.01)
  H04N 9/74 (2006.01)
  G06K 9/40 (2006.01)
  G06K 9/32 (2006.01)
  H04N 1/387 (2006.01)
  H04N 1/40 (2006.01)
  H04N 5/50 (2006.01)

(52) U.S. Cl. ........ 345/606; 345/581; 345/586; 345/660; 345/698; 382/254; 382/274; 382/298; 382/300; 348/597; 348/563; 348/569

(58) Field of Classification Search .......... 345/418–428, 345/581, 586, 589, 606, 618–619, 639, 643, 345/690, 698, 472, 660; 358/525, 528, 530, 358/537, 447–448, 461, 441, 451–452; 382/162, 382/254, 274, 264, 298–300; 348/571, 576, 348/590–592, 597–599, 607, 333.12, 563–569
See application file for complete search history.

(56) References Cited

U.S. PATENT DOCUMENTS

| | | | | |
|---|---|---|---|---|
| 4,920,571 A | * | 4/1990 | Abe et al. | 382/300 |
| 5,914,725 A | * | 6/1999 | MacInnis et al. | 345/441 |
| 6,023,302 A | * | 2/2000 | MacInnis et al. | 348/597 |
| 6,727,908 B1 | * | 4/2004 | Wright et al. | 345/606 |
| 6,870,538 B2 | | 3/2005 | MacInnis et al. | |
| 2002/0177481 A1 | * | 11/2002 | Kitsutaka | 463/30 |
| 2006/0007247 A1 | * | 1/2006 | Slavin | 345/660 |
| 2006/0072853 A1 | * | 4/2006 | Clarke et al. | 382/298 |
| 2007/0206206 A1 | * | 9/2007 | Kondo et al. | 358/1.2 |
| 2007/0222790 A1 | * | 9/2007 | Winger | 345/592 |
| 2008/0198168 A1 | * | 8/2008 | Jiao et al. | 345/506 |

* cited by examiner

*Primary Examiner* — Wesner Sajous
(74) *Attorney, Agent, or Firm* — Thomas|Kayden

(57) ABSTRACT

The invention provides the image method and apparatus to increase the sharpness of a resized image. The image includes a plurality of pixels with an alpha value and an image data. The method detects the alpha value of neighboring first and second pixels. Weighting values of interpolated pixels between the first and second pixels are determined. The image data of the interpolated pixels are set to be identical to the image data of the first pixel when one of the first pixel or the second pixel is zero.

20 Claims, 6 Drawing Sheets

IMAGE PROCESSING METHOD AND SYSTEM

BACKGROUND OF THE INVENTION

1. Field of the Invention

The invention relates to an apparatus and method for image processing, and more particularly to an image processing method/apparatus capable of increasing sharpness in a scaled image.

2. Description of the Related Art

Interpolation is widely used to find unknown pixel values based on the known pixel values. Common interpolation algorithms can be grouped into two categories, adaptive and non-adaptive. Adaptive methods change depending interpolated pixels, while non-adaptive methods treat all pixels equally. Linear interpolation is the most basic form of interpolation. To find an unknown pixel P3 the factors x and (1−x) are used in a weighted average of two known pixels, P1 and P2 as shown by the following formula:

$$P3=P1 \text{ by } x+P2 \text{ by}(1-x).$$

If more pixels adjacent to the unknown pixel P3 are known and included, interpolation of the unknown pixel P3 is more accurate. With the exception of linear interpolation, bilinear interpolation, bicubic interpolation, or higher order interpolation, such as spline and sinc interpolations are also commonly used interpolations for increasing the accuracy of unknown pixels.

FIG. 1 is schematic diagram of an enlarged image by a conventional resizing mechanism. The enlarged image 12 and the bottom image 11 are in different layers, a widely applied technique in display devices. After the image has been enlarged, a blurred edge 13 occurs around the enlarged image 12. Please refer to the enlargement area 14. The pixels 14a and 14e are known pixels, and the pixels 14b, 14c and 14d are determined based on the known pixels, 14a and 14e, and corresponding weighted values. The blurred edge 13 is caused by the interpolated pixels, such as the pixels 14b, 14c and 14d, thus, a low complexity, adaptive and useful image resizing mechanism capable of increasing the sharpness and reducing blur is desirable.

BRIEF SUMMARY OF THE INVENTION

The invention provides an image processing method and system capable of increasing sharpness of a resized image. The term of resizing image or resized image of the present invention should be interpreted as either enlarging or shrinking the image.

In one embodiment of an image processing method the sharpness of the image is far improved comparing to the conventional method after the image is enlarged. Please note that enlarging is only an example in the present invention. The method mentioned below may be applied to the case of shrinking the image as well. The image is comprised of a plurality of pixels having an alpha value and image data. The image processing method comprises: detecting the alpha values of neighboring first and second pixels; determining weighting values of interpolated pixels between the first and second pixels; setting the image data of the interpolated pixels to be the same as the image data of the first pixel when one of the first pixel and second pixels has the alpha value is zero.

In some embodiments of the image processing method a first alpha value and a second alpha value of neighboring first and second pixels are detected; weighted values of interpolated pixels between the first and second pixels are determined; the image data of the interpolated pixel are adjusted when the difference between the first alpha value and the second alpha value exceeds a difference-threshold value or when one of the first alpha value and the second alpha value is zero. The image data of the interpolated pixel is set to be the same as t the image data of the first pixel when the corresponding weighted value does not exceed a weighting-threshold value. Conversely, the image data of the interpolated pixel is set to be the same as the image data of the second pixel when the corresponding weighted value exceeds a weighting-threshold value.

The invention further provides an image processing system. An exemplary embodiment of an image processing system comprises a data latch, a scale unit, an alpha value detector, and an image processing unit. The data latch receives an image comprised of a plurality of pixels, wherein each pixel has an alpha value and an image data. The scale unit has a scale ratio and outputs an enable signal to the alpha value detector. The alpha value detector is activated by the enable signal, and receives the image to output calibrated image data of the interpolated pixels based on the scale ratio. The image processing unit resizes the image based on the scale ratio and the calibrated image data of the interpolated pixels.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
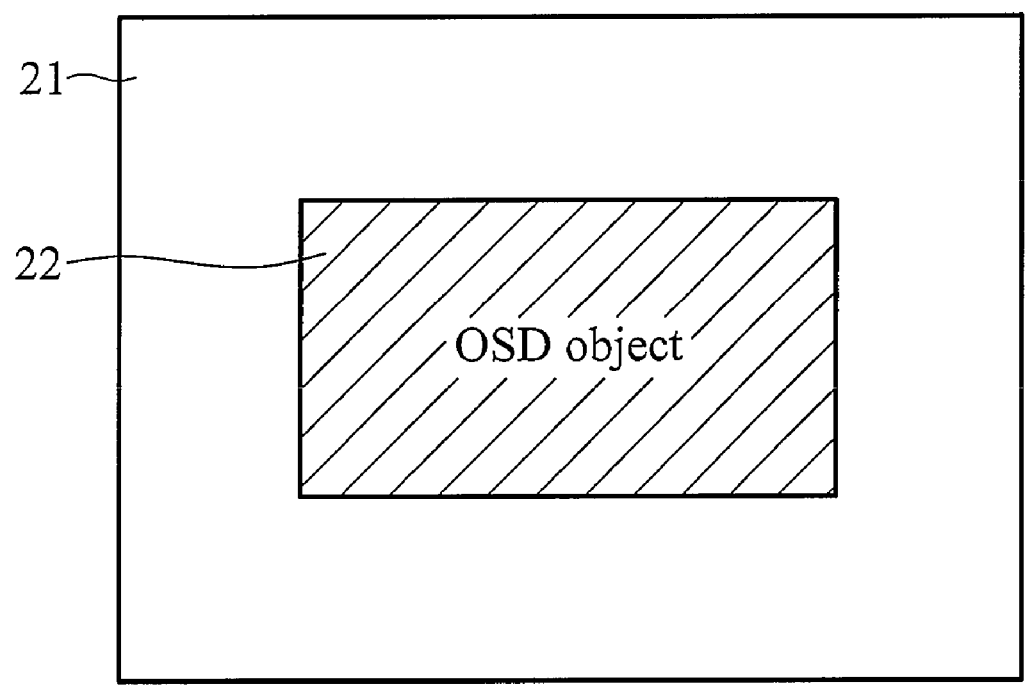
FIG. 2 is a schematic diagram of two images in different layers.

FIG. 2 is a schematic diagram of two images in different layers. The bottom image 21, such as a TV program or wallpaper, is displayed on the bottom layer, and the OSD (on-screen display) object 22, such as setup menu or newly added window, is displayed on an upper layer. The display area of the OSD object 22 does not occupy the entire screen, however, the actual image of the OSD object 22 occupies the entire screen and the pixels not included within the OSD object 22 just are not shown their image data. An image is comprised of a plurality of pixels. Each pixel comprises display data comprising an alpha value and an image data. The image data may comprise RGB, YCbCr or CMYK image data and the alpha value represents pixel luminance. In a multi-layer display mechanism, the alpha value is important. Suppose the alpha value is between 0 and 255, and with increased alpha value, the sharper the displayed image data of the pixel. Suppose the OSD object 22 is a red rectangle and the bottom image 21 is a scenic image, wherein each pixel within the OSD object 22 has a display data (255, 255, 0, 0). If the alpha values of the pixels of the OSD object 22 decrease, the scenic image under the OSD object 22 becomes clear. The actual image of the OSD object 22 comprises two parts, one is the OSD object 22 with pixels having the maximum alpha value, and the alpha value of the pixels of the remaining area is zero, thus, only the OSD object 22 is shown.

Figure 3:
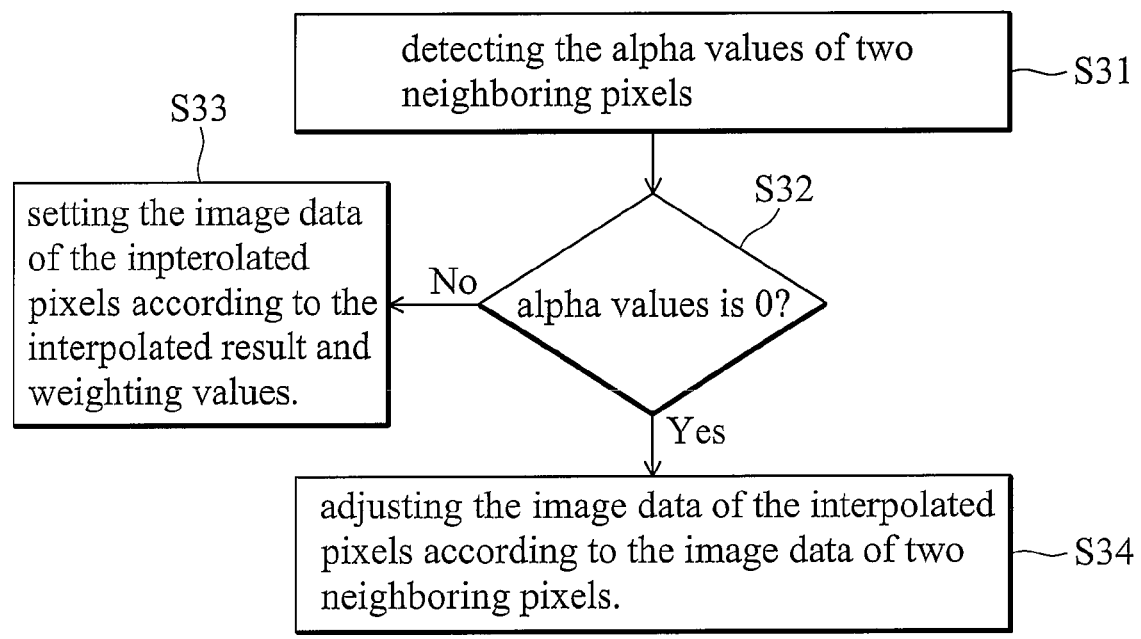
FIG. 3 is a flowchart of an embodiment of the image processing method of the invention.

FIG. 3 is a flowchart of an embodiment of the image processing method of the invention. In step S31, a detector detects the alpha values of the known pixels when the image being resized. In step S32, if the detector does not detect a zero alpha value in the two neighboring pixels, the method advances to step S33 to set the image of the interpolated pixels based on corresponding weighting values, and if the detector detects one of the alpha values of the two neighboring pixels is zero but not both alpha values of the neighboring pixels are zero, the image data of the interpolated pixels are the same as one of the two neighboring pixels in the step S34. In some embodiment, the alpha value of the interpolated pixels may also be adjusted when one of the alpha values of the two neighboring pixels is zero. The alpha value may be adjusted according to the predetermined difference-threshold value.

Figure 1:
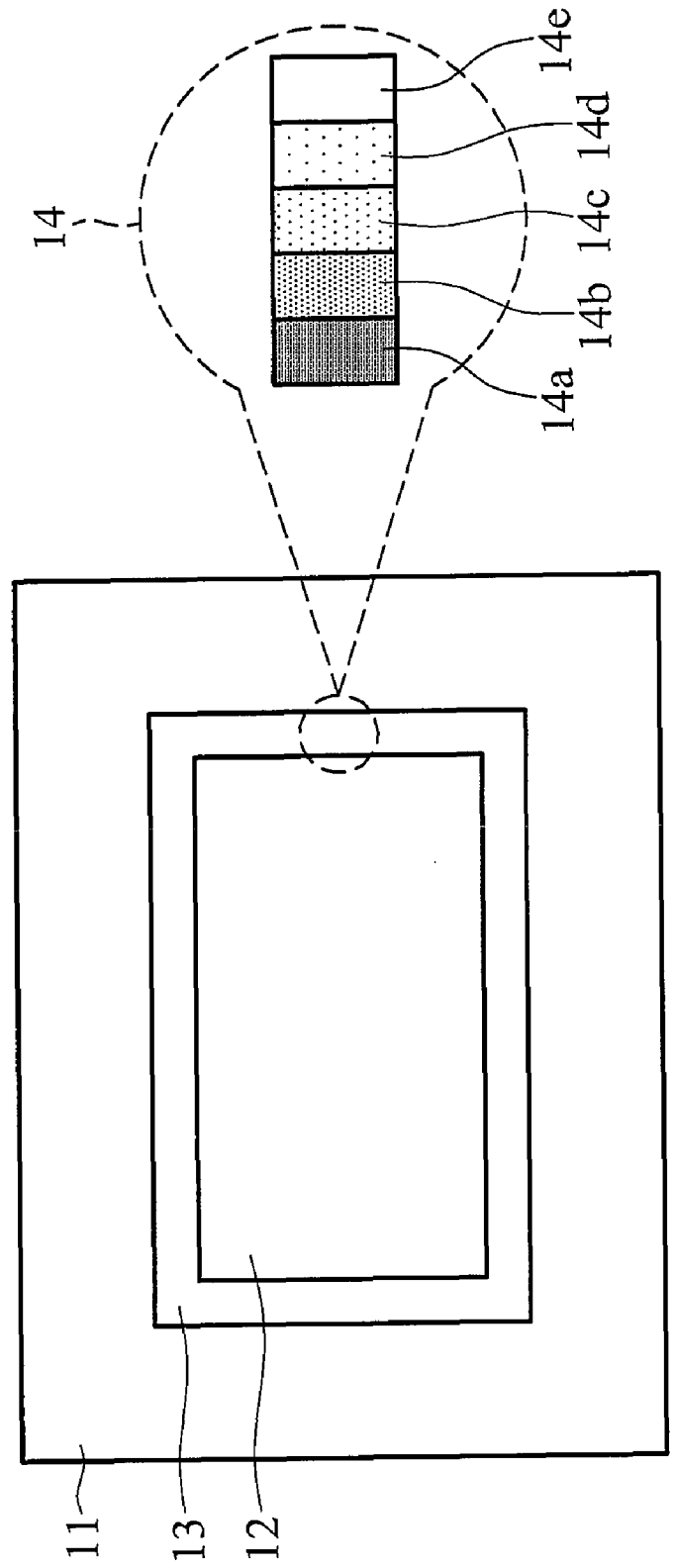
FIG. 1 is schematic diagram of an enlarged image by a conventional resizing mechanism.

Take the pixels 14a to 14e for example. The pixel 14a is originally adjacent to the pixel 14e before the image is enlarged. Please note that the adjacent point merely for illustration purpose. The 14a and 14e may be just neighboring points, there is not necessary to be adjacent points. Suppose the display data of the known pixel 14a is (255, 255, 0, 0) and the display data of another known pixel 14e is (0, 255, 255, 255), the display data of the first interpolated pixel 14d, the second interpolated pixel 14c and the third interpolated pixel 14b is $(255/4, 255, 255/4, 255/4)$, $(255\ by\ 2/4, 255, 255\ by\ 2/4, 255\ by\ 2/4)$ and $(255\ by\ 3/4, 255, 255\ by\ 3/4, 255\ by\ 3/4)$ respectively when both the alpha values of 14a and 14e are zeros or non-zeros or there is not much difference between 14e and 14a. The interpolated pixels 14b, 14c, and 14d are set to be according weighting values as mentioned in the step S33 of FIG. 3. When only one of alpha values of 14a and 14e are zero or the difference of the alpha values of 14a and 14e are large, this results in the blur edge 13 shown in FIG. 1. In order to determine whether the difference of alpha values is large, the difference-threshold maybe used to determine it. The difference-threshold may be predetermined. In order to better to compare the difference with the difference-threshold, the absolute value of the difference is taken as absolute different to compare with the difference-threshold for convenience. In the novel interpolation method described in relation to FIG. 3, the display data of the first interpolated pixel 14d, the second interpolated pixel 14c and the third interpolated pixel 14b is (255, 255, 0, 0), (0, 255, 255, 255) and (0, 255, 255, 255) respectively. Another required factor of the method is the weighting value. In this embodiment, the weighting values of the first interpolated pixel 14d, the second interpolated pixel 14c and the third interpolated pixel 14b are ¼, 2/4 and ¾ respectively. In step S34 of FIG. 3, the display data of the interpolated pixels is identical to one of the two neighboring pixels, and the display data of the interpolated pixels can be determined to be the same as a neighboring pixel based on the weighted values. In this embodiment, a weighting-threshold value is used to determine the display data of the interpolated pixels. Of course, the weighting-threshold may be predetermined or adaptively adjusted according the weighting values of the interpolated pixels. For example, assuming the weighting-threshold value is 0.5 for brevity. The display data of the interpolated pixel is identical to the display data of the pixel 14e when the weighted value of the interpolated pixel is less than 0.5, and the display data of the interpolated pixel is identical to the display data of the pixel 14a when the weighted value of the interpolated pixel is greater than or equal to 0.5. According to the described image processing method, the sharpness of the resized image increases and the blurred image edge is sharpened.

Figure 4:
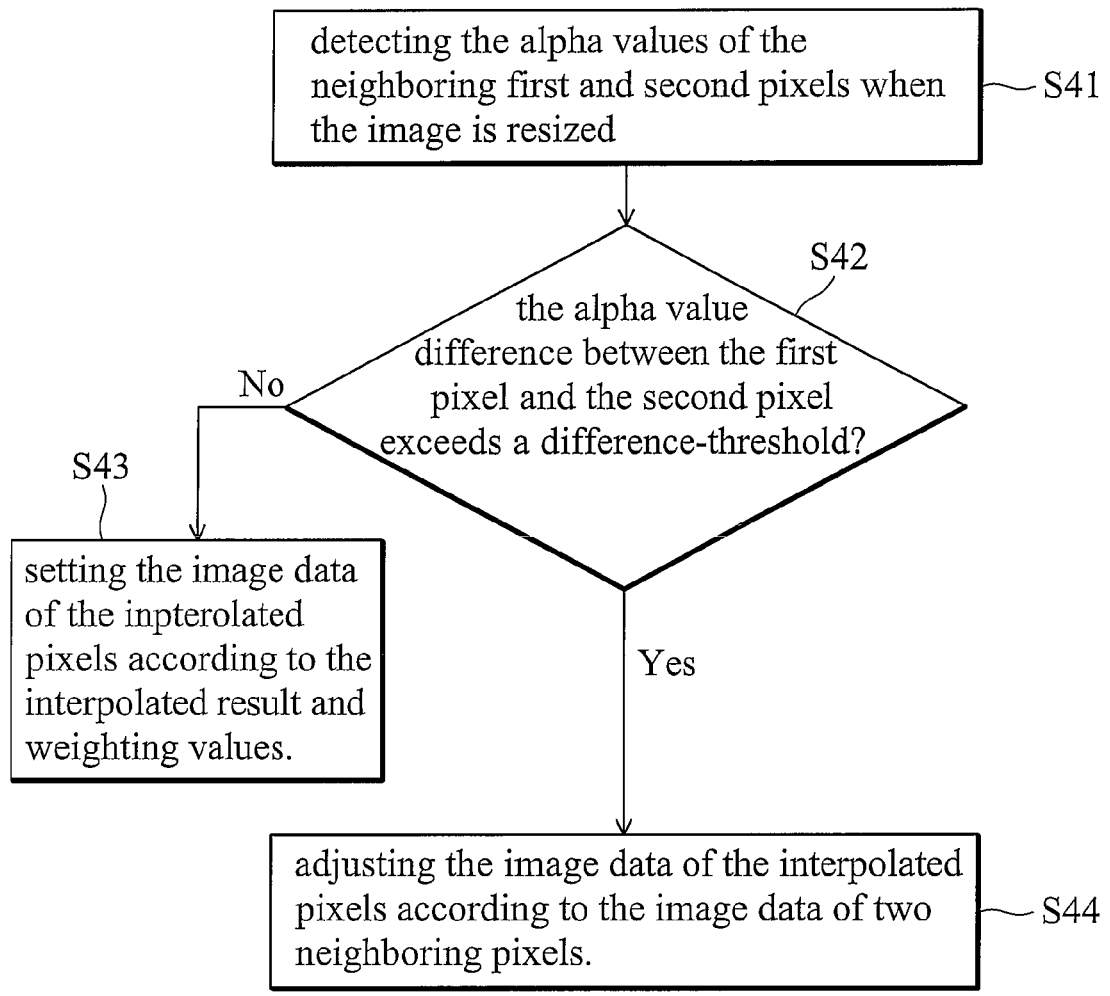
FIG. 4 is a flowchart of another embodiment of the image processing method of the invention.

FIG. 4 is a flowchart of another embodiment of the image processing method of the invention. In step S41, a detector detects the alpha values of the neighboring first and second pixels when the image is resized. In the step S42, the detector detects the alpha value difference between the first pixel and the second pixel, and an interpolation method is applied to resize the image by determining the interpolated pixels according to the corresponding weighting values when the alpha difference does not exceed a difference-threshold (step S43). When the alpha difference exceeds the difference-threshold, the display data of the interpolated pixels is set to be the same as the display data of the first pixel or the display data of the second pixel in step S44.

Take the pixels 14a to 14e for example. The pixel 14a is originally neighbored to the pixel 14e prior to enlargement of the method. Suppose the display data of the known pixel 14a is (255, 255, 0, 0) and the display data of another known pixel 14e is (45, 255, 255, 255), the display data of the first interpolated pixel 14d, the second interpolated pixel 14c and the third interpolated pixel 14b is $(380/4, 255, 255/4, 255/4)$, $(600/4, 255, 255\ by\ 2/4, 255\ by\ 2/4)$ and $(810/4, 255, 255\ by\ 3/4, 255\ by\ 3/4)$ respectively when both the alpha values of 14a and 14e are zeros or non-zeros or there is not much difference between 14e and 14a. When only one of alpha values of 14a and 14e are zero or non-zero the difference of the alpha values of 14a and 14e are large. In this embodiment, the difference-threshold of the alpha value difference is 200, and the alpha value difference between the first pixel and the second pixel exceeds the difference-threshold. The weighted values of the first interpolated pixel 14d, the second interpolated pixel 14c and the third interpolated pixel 14b are ¼, 2/4 and ¾ respectively. A weighting-threshold value is used to determine the display data of the interpolated pixels. In one embodiment, the weighting-threshold value may be determined based on the weighted values. For example, the weighting-threshold value may be the median of the weighted values or any predetermined value between 0 to 1, and in this embodiment, the weighting-threshold value is 0.5. In some other embodiments, the weighting-threshold may be adjusted according to the generated weighting values of the interpolated pixels. The display data of the interpolated pixel is identical to the display data of the pixel 14e when the weighted value of the interpolated pixel is less than 0.5, and the display data of the interpolated pixel is identical to the display data of the pixel 14a when the weighted value of the interpolated pixel is greater than or equal to 0.5. Thus, the calibrated display data of the interpolated pixels 14b to 14d is (255, 255, 0, 0), (255, 255, 0, 0), and (45, 255, 255, 255).

Figure 5:
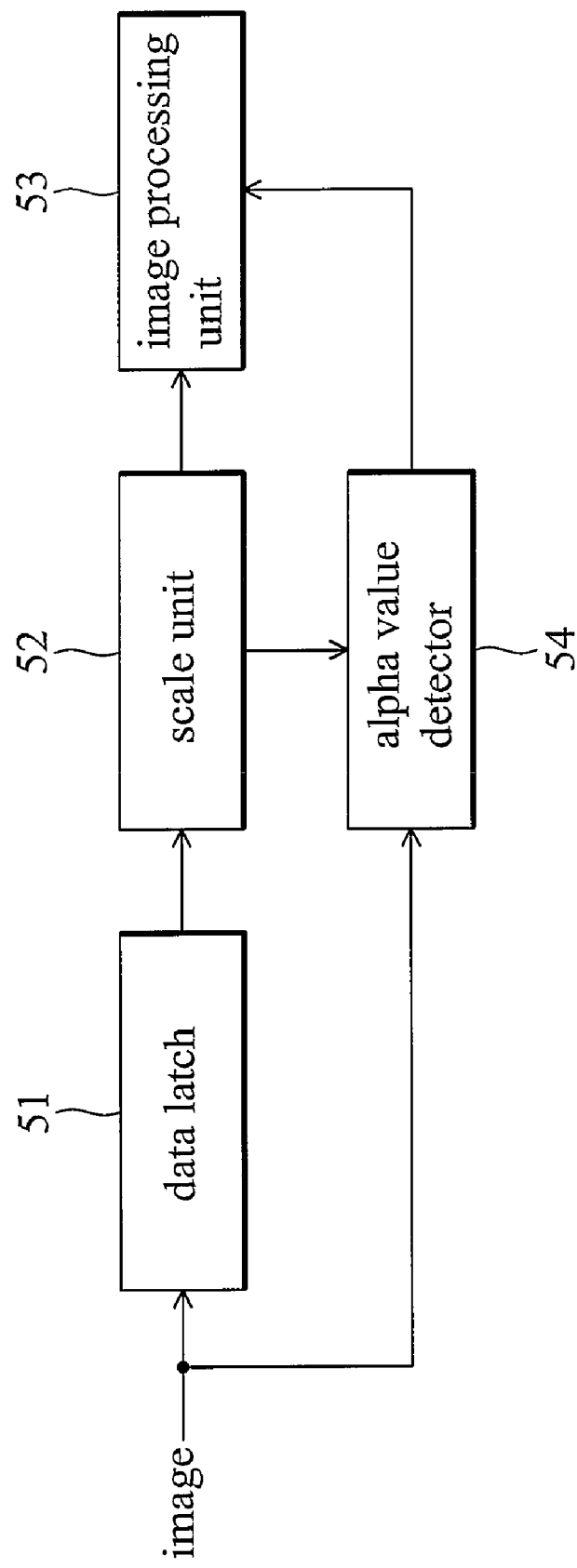
FIG. 5 is a block diagram of an embodiment of an image processing system of the invention.
Figure 6:
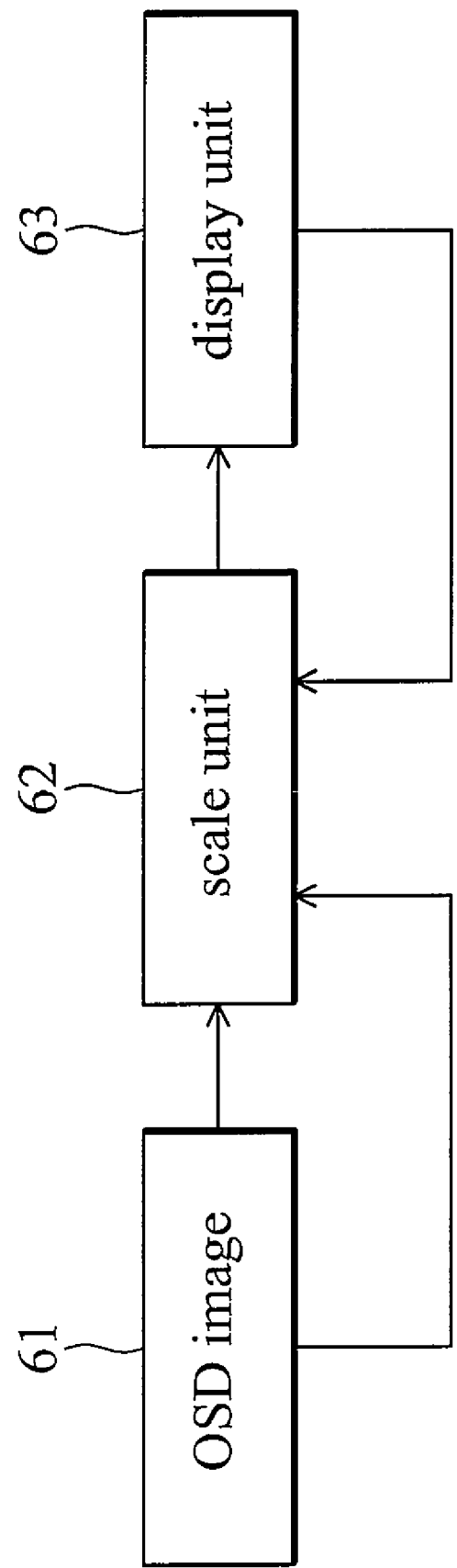
FIG. 6 is a block diagram of another embodiment of the image processing system for an OSD or a sub-picture unit (SPU) image.

FIG. 5 is a block diagram of an embodiment of an image processing system of the invention. The data latch 51 receives an image comprised of a plurality of pixels, wherein each pixel has an alpha value and an image data. The scale unit 52 has a scale ratio and outputs an enable signal to the alpha value detector 54. The alpha value detector 54 is activated by the enable signal, and receives the image to output the calibrated image data of the interpolated pixels based on the scale ratio. The image processing unit 53 resizes the image based on the scale ratio and image data of the interpolated pixels. A weighting-threshold value is used to determine the display data of the interpolated pixels based on the scale ratio. When the weighting value of a first interpolated pixel exceeds a weighting-threshold value, the image data of the first interpolated pixel is identical to the image data of one of the reference pixels used to determine the first interpolated pixel, wherein the reference pixels are the known pixels adjacent to the unknown first interpolated pixel. In addition, the calibrated alpha values of the interpolated pixel can also be outputted for the image processing purpose. Such that setting the alpha value equal to one of the reference pixel according to the weighting values of the interpolated pixels and the weighting-threshold value FIG. 6 is a block diagram of another embodiment of the image processing system for an OSD or a sub-picture unit (SPU) image. The resolution of the OSD image 61 is 720 by 480 pixels. The resolution of the display unit 63 is 1440 by 960 pixels. The scale unit 62 resizes the OSD image 61 based on the resolutions of the OSD image 61 and the display unit 63. The scale unit further performs the image processing methods illustrated in FIG. 3 and FIG. 4 to increase the sharpness of the resized OSD image 61.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image processing method, applied to an image displayed by a display unit, wherein the image comprises a plurality of pixels and each pixel has an alpha value and an image data, the method comprising:
   selecting a first pixel and a second pixel, wherein the first pixel and the second pixel are neighboring each other;
   detecting the alpha value of the first pixel and the alpha value of the second pixel;
   determining the image data of the first pixel and the image data of the second pixel;
   determining interpolated pixels according to the first and second pixels;
   generating weighting values of interpolated pixels, wherein the weight value for each interpolated pixel are different to each other; and
   adjusting the image data of the interpolated pixels if one of the first and second pixels has the alpha value being zero.

2. The method as claimed in claim 1, wherein if neither the alpha values of the first and second pixels are zero, the image data of the interpolated pixels is determined based on the corresponding weighting values.

3. The method as claimed in claim 1, wherein if both the alpha values of the first and second pixels are zero, the image data of the interpolated pixels is determined based on the corresponding weighting values.

4. The method as claimed in claim 1, wherein image data of an interpolated pixel, obtained from the interpolated pixels, is set to be the same as the image data of the first pixel when the corresponding weighted value of the interpolated pixel exceeds a weighting-threshold value.

5. The method as claimed in claim 4, wherein the image data of the interpolated pixels being the same as the image data of the second pixel when the corresponding weighted value does not exceed a weighting-threshold value.

6. The method as claimed in claim 5, wherein the weighting-threshold value is predetermined.

7. The method as claimed in claim 5, wherein the weighting threshold value is adaptively adjusted according to the generated weighting values of the interpolated pixels.

8. The method as claimed in claim 1, wherein the image data comprises RGB image data.

9. The method as claimed in claim 1, wherein the image data comprises YCbCr image data.

10. An image processing method, applied to an image displayed by a display unit, wherein the image comprises a plurality of pixels and each pixel has an alpha value and an image data, the method comprising:
    selecting a first pixel and a second pixel, wherein the first pixel and the second pixel are neighboring each other;
    detecting the alpha value of the first pixel and the alpha value of the second pixel;
    determining the image data of the first pixel and the image data of the second pixel;
    determining interpolated pixels according to the first and second pixels;
    generating weighting values of interpolated pixels, wherein the weight value for each interpolated pixel are different to each other; and
    adjusting the image data of the interpolated pixels when an absolute difference between the first alpha value and the second alpha value exceeds a difference-threshold value.

11. The method as claimed in claim 10, wherein if the absolute difference between the first alpha value and the second alpha value less than a difference-threshold value, the image data of the interpolated pixels is determined based on the corresponding weighting values.

12. The method as claimed in claim 10, wherein image data of an interpolated pixel, obtained from the interpolated pixels, is set to be the same as the image data of the first pixel when the corresponding weighted value of the interpolated pixel does not exceed a weighting-threshold value.

13. The method as claimed in claim 12, wherein the image data of the interpolated pixel, obtained from the interpolated pixels, is set to be the same as the image data of the second pixel when the corresponding weighted value of the interpolated pixel exceeds the weighting-threshold value.

14. The method as claimed in claim 13, wherein the weighting-threshold value is predetermined.

15. The method as claimed in claim 13, wherein the weighting-threshold value is adaptively adjusted according to the generated weighting values of the interpolated pixels.

16. The method as claimed in claim 10, wherein the image data comprises RGB image data.

17. The method as claimed in claim 10, wherein the image data comprises YCbCr image data.

18. An image processing apparatus, comprising:
    a data latch receiving an image comprised of a plurality of pixels, wherein each pixel has an alpha value and an image data;
    a scale unit having a scale ratio to output an enable signal;
    an alpha value detector activated by the enable signal, receiving the image to output the calibrated image data of interpolated pixels based on the scale ratio; and
    an image processing unit to resize the image based on the scale ratio and the image data of the interpolated pixels.

19. The apparatus as claimed in claim 15, wherein the alpha value detector further determines weighted values of the interpolated pixels based on the scale ratio.

20. The apparatus as claimed in claim 16, wherein when the weighted value of a first interpolated pixel exceeds a predetermined value, the image data of the first interpolated pixel is set to be identical to the image data of one of the reference pixels which are used to determine the first interpolated pixel.

* * * * *